US010394457B2

(12) United States Patent
Candelaria et al.

(10) Patent No.: US 10,394,457 B2
(45) Date of Patent: Aug. 27, 2019

(54) CONTROLLER-MEDIATED VOLUME TRANSFORMATION IN A SHARED-RESOURCE ENVIRONMENT

(71) Applicant: International Business Machines Corporation, Armonk, NY (US)

(72) Inventors: Susan K. Candelaria, Tucson, AZ (US); John R. Paveza, Morgan Hill, CA (US); Dale F. Riedy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/001,834

(22) Filed: Jun. 6, 2018

(65) Prior Publication Data

US 2018/0284984 A1 Oct. 4, 2018

Related U.S. Application Data

(63) Continuation of application No. 14/848,229, filed on Sep. 8, 2015, now Pat. No. 9,996,272.

(51) Int. Cl.

| | |
|---|---|
| ***G06F 3/00*** | (2006.01) |
| ***G06F 3/06*** | (2006.01) |
| ***G06F 13/32*** | (2006.01) |
| ***H04L 29/08*** | (2006.01) |

(52) U.S. Cl.

CPC .............. *G06F 3/061* (2013.01); *G06F 3/065* (2013.01); *G06F 3/067* (2013.01); *G06F 3/0619* (2013.01); *G06F 3/0685* (2013.01); *G06F 13/32* (2013.01); *H04L 67/1097* (2013.01)

(58) Field of Classification Search

CPC ........ G06F 13/32; G06F 3/061; G06F 3/0619; G06F 3/065; G06F 3/0665; G06F 3/067

See application file for complete search history.

(56) References Cited

U.S. PATENT DOCUMENTS

| | | | |
|---|---|---|---|
| 6,662,198 | B2 | 12/2003 | Satyanarayanan et al. |
| 7,111,194 | B1 | 9/2006 | Schoenthal et al. |
| 8,332,365 | B2 | 12/2012 | McAlister et al. |

(Continued)

OTHER PUBLICATIONS

Anonymous, "Method to enable data integrity check at secondary site during Replication," IP.com Prior Art Database Technical Disclosure, Mar. 11, 2013, pp. 1-7.

(Continued)

*Primary Examiner* — Idriss N Alrobaye
*Assistant Examiner* — Richard B Franklin
(74) *Attorney, Agent, or Firm* — Zilka-Kotab, P.C.

(57) ABSTRACT

In one embodiment, a computer-implemented method includes making a determination, by a computer, to perform a transforming operation on a shared volume. A notify command is sent to a storage controller of the shared volume, the notify command including an action to be taken by other hosts connected to the shared volume. A message is received from the storage controller, the message indicating that responses have been received from the other host systems connected to the shared volume. A determination is made as to whether to perform the transforming operation based on the responses. The transforming operation is performed on the shared volume in response to the responses from the other host systems indicating that the other host systems successfully performed the action specified in the notify command.

20 Claims, 5 Drawing Sheets

(56) References Cited

U.S. PATENT DOCUMENTS

| | | | |
|---|---|---|---|
| 8,762,681 | B2 | 6/2014 | Banzhaf et al. |
| 9,021,296 | B1 | 4/2015 | Kiselev et al. |
| 9,146,790 | B1 | 9/2015 | Dash et al. |
| 9,817,589 | B2 | 11/2017 | Paveza et al. |
| 9,996,272 | B2 | 6/2018 | Candelaria et al. |
| 10,261,710 | B2 | 4/2019 | Paveza et al. |
| 2013/0198868 | A1 | 8/2013 | Georgiev |
| 2013/0311659 | A1 | 11/2013 | Curran et al. |
| 2014/0122795 | A1 | 5/2014 | Chambliss |
| 2017/0068450 | A1 | 3/2017 | Candelaria et al. |
| 2017/0068471 | A1 | 3/2017 | Paveza et al. |
| 2017/0344293 | A1 | 11/2017 | Paveza et al. |

OTHER PUBLICATIONS

Scheuermann et al., "On Storage Structures and Their Transformations," IP.com Prior Art Database Technical Disclosure, Mar. 30, 2007, (original publication date: Jun. 30, 1975), 23 pages.

Candelaria et al., U.S. Appl. No. 14/848,229, filed Sep. 8, 2015.

Paveza et al., U.S. Appl. No. 14/848,218, filed Sep. 8, 2015.

Non-Final Office Action from U.S. Appl. No. 14/848,218, dated Dec. 8, 2016.

Final Office Action from U.S. Appl. No. 14/848,218, dated Mar. 28, 2017.

Notice of Allowance from U.S. Appl. No. 14/848,218, dated Jul. 10, 2017.

Paveza et al., U.S. Appl. No. 15/682,286, filed Aug. 21, 2017.

Corrected Notice of Allowance from U.S. Appl. No. 14/848,218, dated Oct. 13, 2017.

Notice of Allowance from U.S. Appl. No. 14/848,229, dated Feb. 6, 2018.

Non-Final Office Action from U.S. Appl. No. 15/682,286, dated May 1, 2018.

List of IBM Patents or Patent Applications Treated as Related.

Final Office Action from U.S. Appl. No. 15/682,286, dated Sep. 17, 2018.

Notice of Allowance from U.S. Appl. No. 15/682,286, dated Dec. 3, 2018.

CONTROLLER-MEDIATED VOLUME TRANSFORMATION IN A SHARED-RESOURCE ENVIRONMENT

BACKGROUND

The present invention relates to computing environments including shared resources, and more specifically, this invention relates to mediating performance of a transformation operation on a shared volume.

In environments where a shared resource, such as a storage volume, is accessible to multiple host systems, some host-initiated operations may transform the resource in a fundamental way. When one of these operations is performed by one of the connected host systems, it may be necessary to render the shared resource unavailable to the other connected host systems. In other words, some action may be performed to make the shared resource unavailable for use to applications on the other connected host systems. In one particular example, on a host system running z/OS, a VARY command may be issued to vary the shared resource offline to z/OS.

If the shared resource remains available to one or more host systems during the operation, then data corruption or undetected data loss can occur.

In some use cases, such as Hierarchical Storage Management (HSM) Fast Replication Backup, a shared volume may remain online because it is expensive to vary numerous devices offline/online to a host system that will then back up the shared volume to tape.

Additionally, after performance of the operation completes, the shared resource may then again be made available to the host systems. If a host system that is unaware of the operation attempts to write to data sets that have been moved as a result of the operation, then the effects of the operation may be lost, and/or a file directory may become corrupted.

BRIEF SUMMARY

In one embodiment, a computer-implemented method includes making a determination, by a computer, to perform a transforming operation on a shared volume. A notify command is sent to a storage controller of the shared volume, the notify command including an action to be taken by other hosts connected to the shared volume. A message is received from the storage controller, the message indicating that responses have been received from the other host systems connected to the shared volume. A determination is made as to whether to perform the transforming operation based on the responses. The transforming operation is performed on the shared volume in response to the responses from the other host systems indicating that the other host systems successfully performed the action specified in the notify command.

A computer program product for volume transformation in a shared-resource environment includes a computer readable storage medium having program instructions embodied therewith. The computer readable storage medium is not a transitory signal per se. The program instructions are executable by a computer to cause the computer to perform the foregoing method.

A system, according to one embodiment, includes a processor and logic integrated with and/or executable by the processor, the logic being configured to cause the processor to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
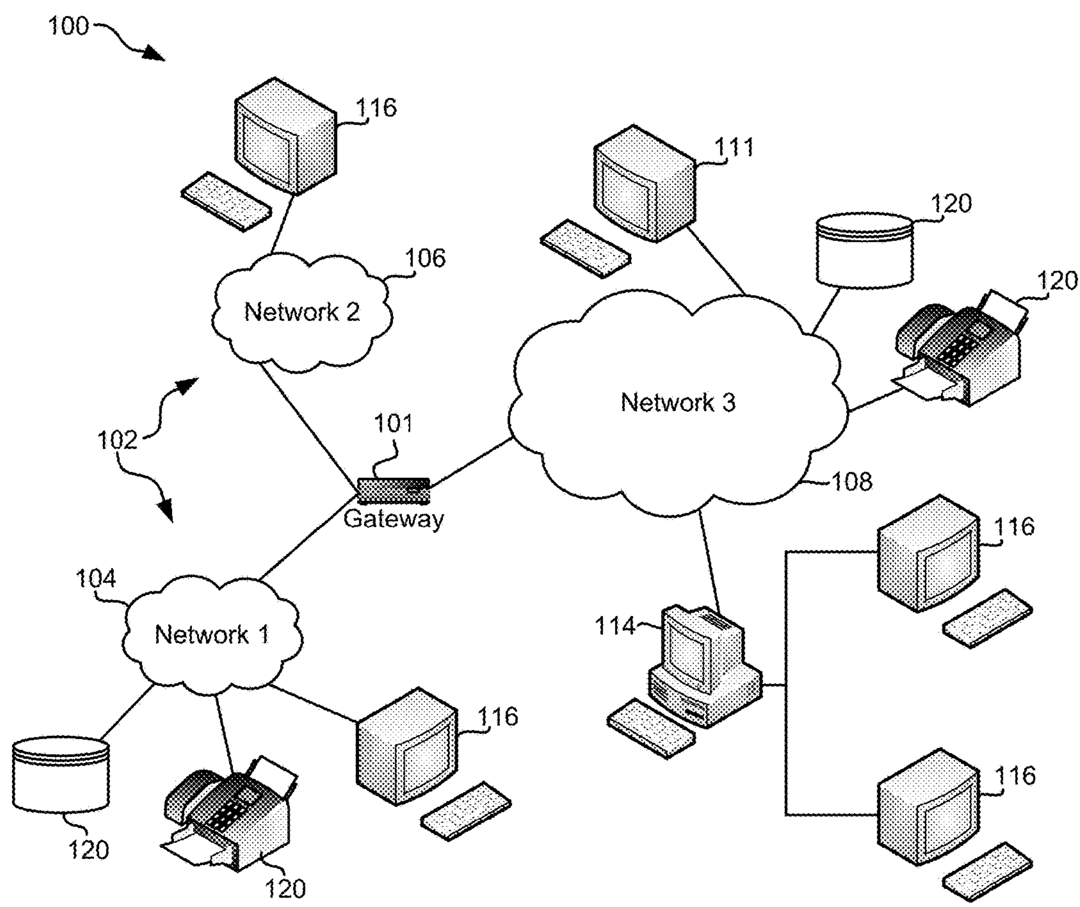
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for mediating transformation of a volume in a shared-resource environment.

In the various embodiments disclosed herein, prior to an initiating host system performing a transforming operation on a shared volume, the initiating host system may ensure that other host systems are not actively using the shared volume by polling, via a storage controller, the other host systems. Each of the other host systems connected to the shared volume may be asked to cast a vote as to whether the initiating host system may perform the transforming operation on the shared volume. The storage controller may then summarize the result and present the result to the initiating host system. Further, after completing the transforming operation on the shared volume, the initiating host system may notify the other host systems, via the storage controller, that the transforming operation has completed and the other host systems may resume access of the shared volume. Accordingly, in a shared-resource environment, data loss may be prevented by preventing transforming operations, such as re-imaging operations, on a shared volume without permissive votes from host systems that are using the shared volume.

In one general embodiment, a computer program product is provided for storage controller-mediated volume transformation in a shared-resource environment. The computer program product comprises a computer readable storage medium having program instructions embodied therewith. The program instructions are executable by a computer to cause the computer to receive, from an initiating host system, a command to send a notification to other host systems connected to a shared volume. Additionally, the programs instructions are executable by the computer to cause the computer to broadcast an interrupt to the other host systems connected to the shared volume, and receive responses from the other host systems connected to the shared volume. Moreover, the programs instructions are executable by the computer to cause the computer to notify the initiating host system of the responses received from the other host systems connected to the shared volume.

In another general embodiment, a computer-implemented method is provided for storage controller-mediated volume transformation in a shared-resource environment. The computer-implemented method includes receiving, utilizing a processor, a command, from an initiating host system, to send a notification to other host systems connected to a shared volume. The computer-implemented method also includes broadcasting an interrupt to the other host systems connected to the shared volume, and receiving responses from the other host systems connected to the shared volume. The computer-implemented method further includes notifying the initiating host system of the responses received from the other host systems connected to the shared volume.

In another general embodiment, a system is provided for storage controller-mediated volume transformation in a shared-resource environment. The system comprises a processor and logic integrated with and/or executable by the processor. The logic is configured to cause the processor to receive, from an initiating host system, a command to send a notification to other host systems connected to a shared volume. The logic is further configured to cause the processor to broadcast an interrupt to the other host systems connected to the shared volume, and receive responses from the other host systems connected to the shared volume. Also, the logic is configured to cause the processor to notify the initiating host system of the responses received from the other host systems connected to the shared volume.

In another general embodiment, a computer program product is provided for storage controller-mediated volume transformation in a shared-resource environment. The computer program product comprises a computer readable storage medium having program instructions embodied therewith. The program instructions are executable by a computer to cause the computer to determine to perform a transforming operation on a shared volume. Also, the program instructions are executable by the computer to cause the computer to send a notify command to a storage controller of the shared volume. The notify command includes an action. Additionally, the program instructions are executable by the computer to cause the computer to receive a message from the storage controller indicating that responses have been received from other host systems connected to the shared volume, review the responses received from the other host systems connected to the shared volume, and perform the transforming operation on the shared volume when the responses from the other host systems indicate that the other host systems successfully performed the action specified in the notify command.

In another general embodiment, a system is provided for storage controller-mediated volume transformation in a shared-resource environment. The system comprises a processor and logic integrated with and/or executable by the processor. The logic is configured to cause the processor to determine to perform a transforming operation on a shared volume, and send a notify command to a storage controller of the shared volume. The notify command includes an action. Also, the logic is configured to cause the processor to receive, from the storage controller, a message indicating that responses have been received from other host systems connected to the shared volume, review the responses received from the other host systems connected to the shared volume, and perform the transforming operation on the shared volume when the responses from the other host systems indicate that the other host systems successfully performed the action specified in the notify command.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
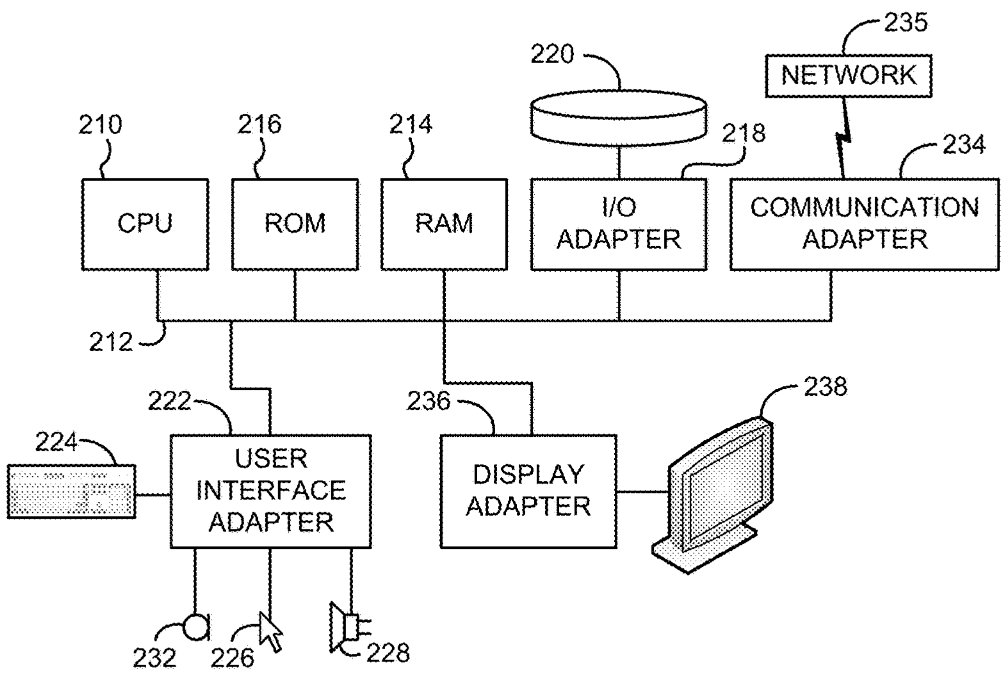
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
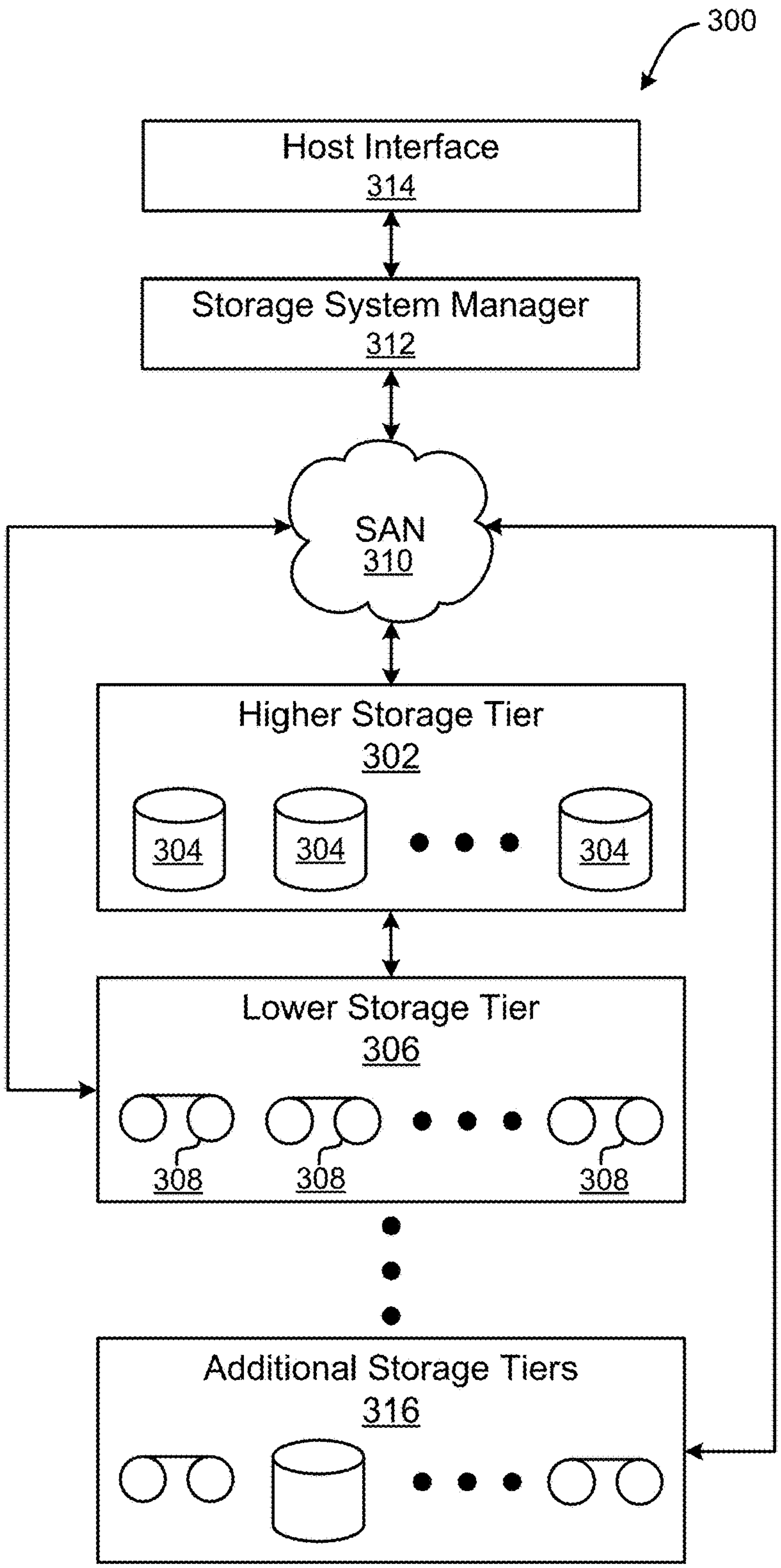
FIG. 3 illustrates a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
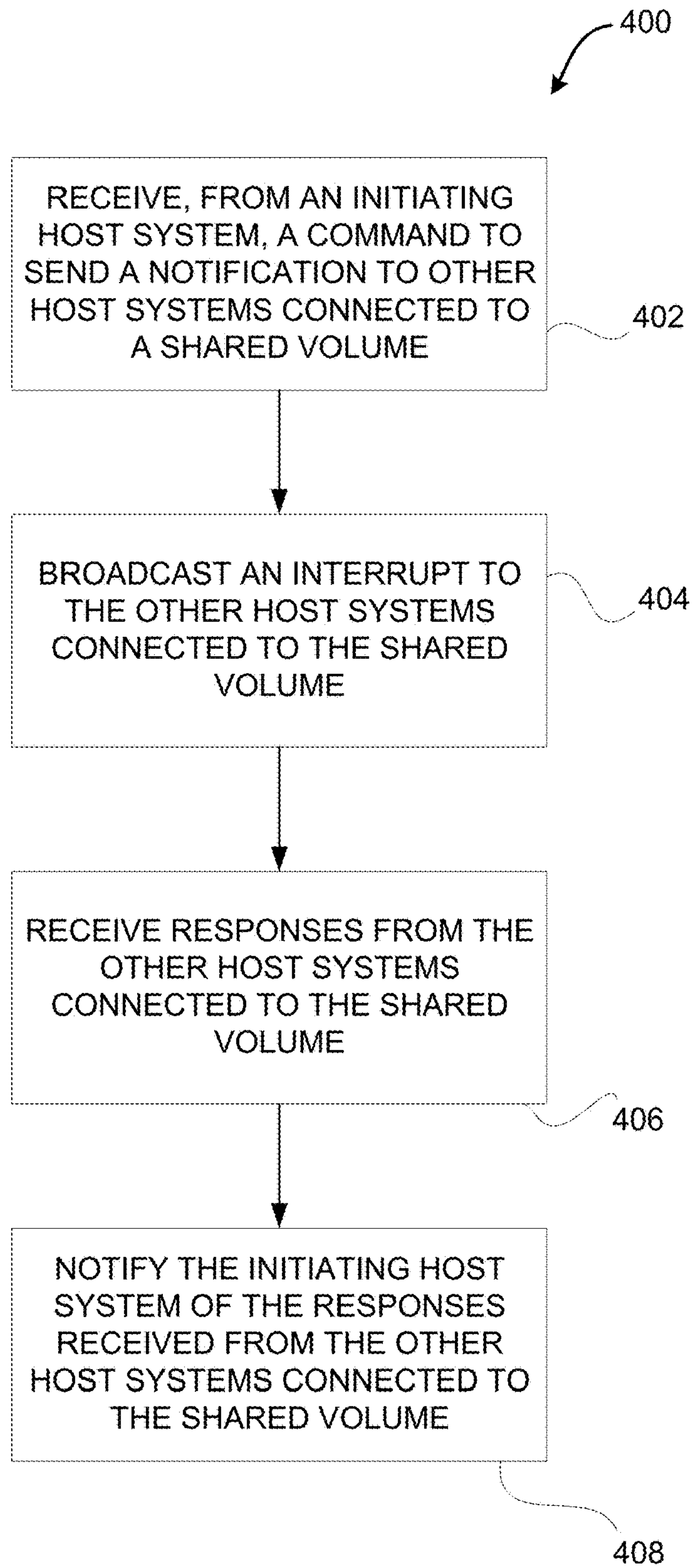
FIG. 4 illustrates a computer-implemented method for controller-mediated volume transformation in a shared-resource environment, in accordance with another embodiment.

Now referring to FIG. 4, a flowchart of a computer-implemented method 400 for controller-mediated volume transformation in a shared-resource environment, is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by storage controller, such as the storage system manager 312 described in the context of FIG. 3, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, the method 400 initiates with operation 402, where a command is received, from an initiating host system, to send a notification to other host systems connected to a shared volume.

As used herein, a volume includes any storage medium associated with a logical disk. Each volume may comprise a single accessible storage area with a file system. Further, a volume may include a logical volume, where the logical volume is composed of logical partitions that are allocated onto multiple physical partitions. Accordingly, a volume may reside on one or more hard disk drives, solid state drives, tapes, etc., and the volume may be composed a plurality of extents, where each extent may be associated with a contiguous range of addressable data units within the volume.

In various embodiments, the shared volume may be a volume that is accessible to one or more host systems. The host systems may include one or more remote hosts systems that access the shared volume via a network. Further, a storage controller may manage access of the shared volume by the host systems. In other words, the storage controller may ensure the integrity of the data on the shared volume by mediating read/write operations directed to the shared volume from by the host systems. In one embodiment, the shared volume comprises an Extended Count-Key-Data (ECKD) volume.

The command received from the initiating host system directs the storage controller to provide a notification to the other host systems connected to the shared volume. The command from the initiating host system may direct the storage controller to provide a notification to all other host systems connected to the shared volume. In one embodiment, the initiating host system may have determined to perform a transforming operation on the shared volume, and the command from the initiating host is based on the determination to perform the transforming operation. Further, the command from the initiating host system may request that the other host systems perform an action on the shared volume. In one embodiment, the command may include a parameter. Further, the parameter may identify an action scope, such as, for example, to quiesce the shared volume. In another embodiment, the command may be utilized to collect votes from the other host systems (e.g., is the shared volume online?, etc.).

The initiating host system may comprise any host system connected to the shared volume and that sends the command to the storage controller.

After receiving the command, the storage controller, at operation 404, broadcasts an interrupt to the other host systems connected to the shared volume. In various embodiment, the interrupt is broadcast by the storage controller after the storage controller creates a pending attention message. In one embodiment, the other host systems connected to the shared volume include each remote host system that has an active path group to the shared volume. Further, the interrupt may include an unsolicited attention interrupt. The interrupt may notify each receiving host system that the attention message is pending. The attention message may be stored in a buffer of the storage controller for access by the other host systems. Accordingly, the initiating host system may rely on the storage controller's knowledge of which host systems are actively using the shared volume to determine which host systems should receive the attention message, and to communicate with such host systems.

In some embodiments, the attention message may contain a resource identifier. In particular, the resource identifier may be utilized where the storage controller manages multiple shared resources, such as volumes, and the interrupt is broadcast to all host systems in a subsystem.

In some embodiments, the resource identifier may identify both a type of resource as well as a specific instance of the specified type of resource. Accordingly, the resource identifier may be used to identify hardware resources (shared volume ID), software resources (data set name), and features, such as FlashCopy. For example, a resource type may be "SYSVOL," and an instance of the resource may include a serial number of the device. As another example, a first host system may want to stop other host systems from exploiting hardware FlashCopy for a period of time. In such an example, the resource type may be SYSFEAT, and the instance may be FlashCopy.

At operation 406, responses are received from the other host systems connected to the shared volume.

In one embodiment, after each host system receives the interrupt, the host system may access the attention message pending on the storage controller. Moreover, the attention message may request each host system perform the action specified in the command from the initiating host system. In one embodiment, the attention message may request that each host system vote as to whether a shared resource can go offline. The shared resource may include any shared hardware resource, shared software resource, feature, or function. For example, the attention message may request that each host system vote as to whether the shared volume can go offline. In another embodiment, the attention message may request that each host system quiesce a shared resource, or quiesce the shared resource if there are currently no users, on the host system, of the shared resource. In yet another embodiment, the attention message may request that each host system force the shared resource offline without any voting. For example, the attention message may request that each host system force a shared volume offline without any voting.

After, after receiving the interrupt and accessing the attention message on the storage controller, each host system may decide whether to perform the requested action of the attention message. In one embodiment, each host system may decide whether the shared volume can go offline. In another embodiment, each host system may decide whether to quiesce the shared volume. As an example, the shared volume may be varied offline by a host system based on a request to quiesce the shared volume received by the host system.

In this manner, each of the host systems connected to the shared volume may be asked to quiesce the shared volume so that the initiating host system can perform a transforming operation on the contents of the shared volume. Moreover, each receiving host system may provide a response to the initiating host system that indicates whether or not the receiving host system is able to quiesce the shared volume. In one embodiment, a receiving host system may successfully quiesce the shared volume by making the shared volume locally unavailable for I/O requests. Further, a receiving host system may quiesce the shared volume with a VARY OFF command directed to the shared volume.

Each receiving host system may include a plurality of executing components that reside on the host system. For example, a receiving host system may include an executing directory manager component, a catalog manager component, and/or a copy services manager component, etc. In one embodiment, an event notification facility (ENF) may be utilized within the receiving host system to notify components on the receiving host system that the shared volume is being quiesced. In other words, once a receiving host system identifies the requested action of the attention message, the receiving host system may broadcast an ENF message within the host system to components executing on the host system.

In one embodiment, the components that receive the ENF message may have previously registered to receive ENF messages. For example, the components that receive the ENF message may have previously registered to receive ENF messages pertaining to shared volumes, or pertaining to a particular shared volume, such as the shared volume that the initiating host system intends to perform a transforming operation on. In this manner, the command received from the initiating host system directing the storage controller to provide a notification to the other host systems connected to the shared volume may trigger a cascade of events that results in the individual host systems sending ENF messages to their respective components.

In one embodiment, a host system's ENF message may be a one-way message that simply informs the receiving components of the host system that a shared resource, such as a shared volume or shared feature will be quiesced. In another embodiment, a host system's ENF message may be a message that triggers a vote from the components of the host system. For example, in response to the ENF message, the components of the host system may vote as to whether the shared volume can be quiesced. Based on the votes of the components of the host system, the host system may then determine whether the response to the storage controller should indicate that the host system has quiesced the shared volume, or instead has failed to quiesce the shared volume.

Accordingly, a given host system may decide whether to perform the requested action of the attention message, and then provide a response. The response may indicate whether or not the host system successfully performed the requested action. In other words, the host system may provide the response after successfully performing the requested action, or after unsuccessfully attempting to perform the requested action. For example, the host system may provide a response indicating that the host system was able to quiesce the shared volume. Conversely, the host system may provide a response indicating that the host system is not able to quiesce the shared volume. A given host system may not be able to quiesce the shared volume if the shared volume is currently allocated by the host system. For example, the given host system may not be able to quiesce the shared volume if one or more applications of the host system are actively reading/writing the shared volume (i.e., there is active I/O to/from the shared volume, etc.).

In one embodiment, the response may include a condition code that indicates if the requested action completed successfully or failed. In this manner, responses may be received from the other host systems connected to the shared volume and accumulated, where each of the responses indicates whether a host system was able to successfully complete an action initiated by the command sent from the initiating host system.

In some embodiments, the storage controller may construct a timeout response on behalf of any host system that fails to respond to the attention message within a predetermined time period, such as, for example, 3 seconds, 5 seconds, 10 seconds, etc. after sending the interrupt. In one embodiment, a timeout response constructed by the storage controller on behalf of a given host system may include a condition code indicating that the requested action failed at the given host system. Moreover, any responses received after expiration of the predetermined time period may be discarded by the storage controller. In this manner, the storage controller may accumulate a response, to the attention message, from each of the host systems connected to the shared volume.

Additionally, at operation 408, the storage controller notifies the initiating host system of the responses. In one embodiment, the initiating host system may be notified of the responses using an attention message. For example, the storage controller may create another unsolicited attention message, and notify the initiating host system of the attention message. The initiating host system may then access the attention message within a buffer of the storage controller. The attention message may include all of the responses from the other host systems connected to the shared volume.

Accordingly, for each of the other host systems connected to the shared volume, the attention message may include a response for the other host system that indicates whether the other host system was able to successfully complete the action requested by the command sent from the initiating host system.

If all of the other host systems were able to successfully complete the action requested by the command sent from the initiating host system, the initiating host system may then perform a transforming operation on the shared volume, which is discussed in more detail below.

In one embodiment, after performing the transforming operation on the shared volume, the initiating host system may issue another command to the storage controller. The other command may direct the storage controller to notify the other host systems to perform another action on the shared volume. The other command may direct the storage controller to notify the other host systems to perform a resume device action on the shared volume. In response to the other command, the storage controller may create another pending attention message, and again broadcast an interrupt to the other host systems connected to the shared volume, thereby notifying each of the other host systems that an attention message is pending. As noted above, the other host systems may include any host system with an active path group to the shared volume. The attention message may inform each of the other connected host systems that it can resume access of the shared volume.

Figure 5:
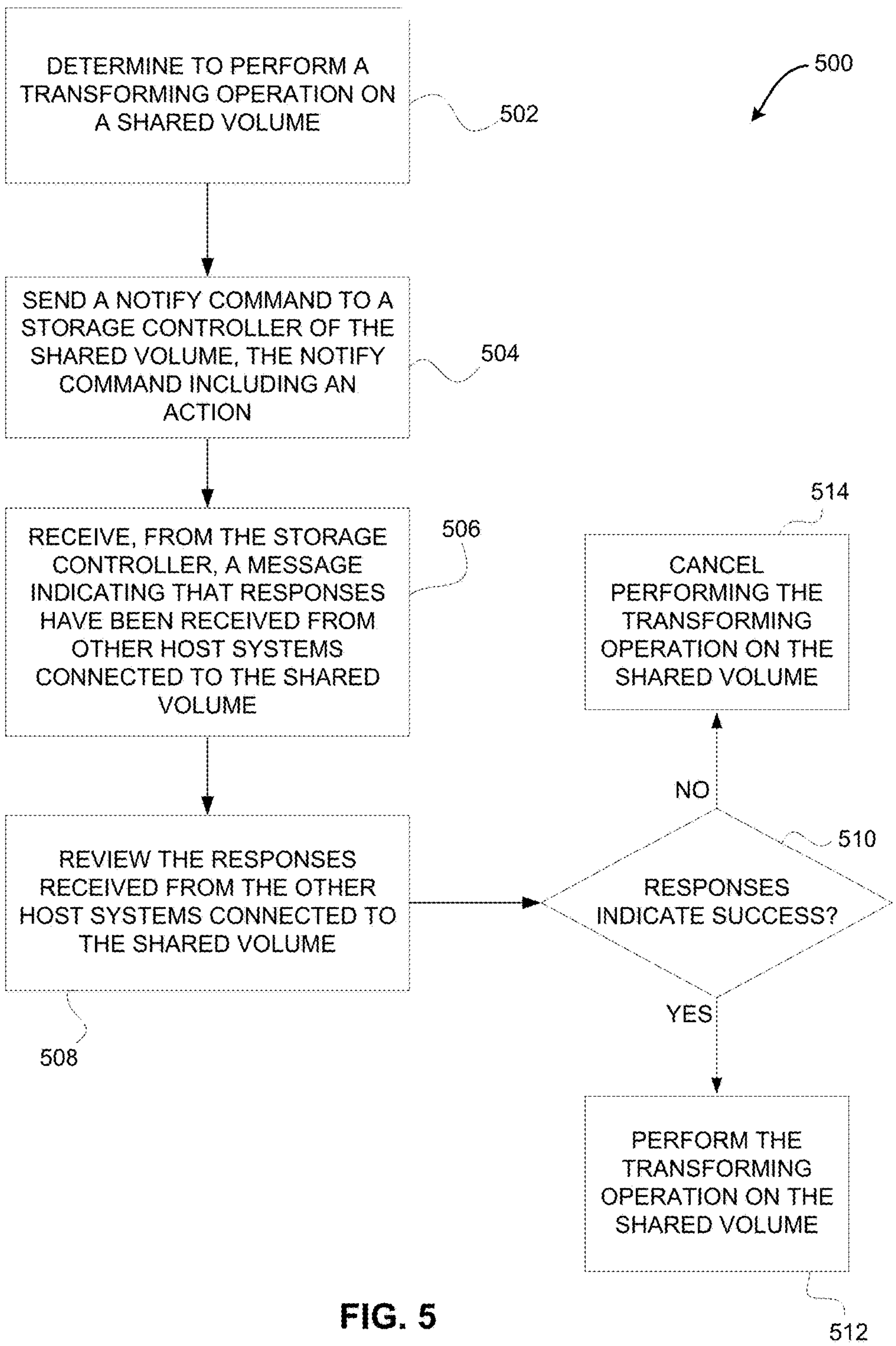
FIG. 5 illustrates a computer-implemented method for controller-mediated volume transformation in a shared-resource environment, in accordance with yet another embodiment.

Now referring to FIG. 5, a flowchart of a computer-implemented method 500 for controller-mediated volume transformation in a shared-resource environment, is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by an initiating host system, such as the data server 114 described within the context of FIG. 1, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 initiates with operation 502, where an initiating host system determines to perform a transforming operation on a shared volume. The transforming operation may include any operation that changes the shared volume in a fundamental way. Further, the initiating host system is connected to the shared volume via a storage controller.

In one embodiment, the steps of method 500 may be performed by an operating system (OS), or utilities of an OS, executing on the initiating host system. For example, the steps of method 500 may be performed by device support facilities and/or storage management subsystem utilities of an OS, such as z/OS.

As one option, the transforming operation may include an initialization of a file directory, after which previously existing files on the shared volume are no longer available. As another option, the transforming operation may include moving a file directory, after which previously existing files of the directory may remain, however the directory will be moved to a new location on the shared volume. As yet another option, the transforming operation may include a copy operation or a restore full volume operation, after which previously existing files on the shared volume may be replaced with a new set of files, and/or a file directory may be moved on the shared volume. As one option, the transforming operation may include an operation that restores an existing file, such that a different version of the file is restored in place. Additionally, the transforming operation may include moving an existing file, such that a same version of the file is moved to a new location on the shared volume.

At operation 504, a notify command is sent to a storage controller of the shared volume. Further, the notify command from the initiating host system includes an action. In one embodiment, the notify command may be sent to the storage controller in response to the determination to perform the transforming operation on the shared volume. By way of sending the notify command to the storage controller, the initiating host system may request that other host systems perform the action on the shared volume. In various embodiments, each host system may be separate instance of a server, such as the data server 114 described within the context of FIG. 1.

In one embodiment, the notify command from the initiating host system directs the storage controller to provide a notification to other host systems connected to the shared volume. The notify command from the initiating host system may direct the storage controller to provide a notification to all other host systems connected to the shared volume. In one embodiment, the notify command may include a parameter. Further, the parameter may identify an action scope, such as, for example, to quiesce the shared volume. In another embodiment, the notify command may be utilized to collect votes from the other host systems connected to the shared volume. In this way, the notify command may request that the other host systems vote as to whether the shared volume can go offline, or request that the other host systems quiesce the shared volume.

As noted above, after receiving the notify command from the initiating host system, the storage controller may broadcast an interrupt to the other host systems connected to the shared volume, and the interrupt may notify each receiving host system that an attention message is pending. After each host system receives the interrupt, the host system may access the attention message pending on the storage controller.

Moreover, the attention message may request each host system perform the action on the shared volume that was requested in the notify command from the initiating host system. For example, the attention message may request that each host system vote as to whether the shared volume can go offline. As another example, the attention message may request that each host system quiesce the shared volume, or quiesce the shared volume if there are currently no users, on the host system, of the shared volume. As yet another example, the attention message may request that each host system force the shared volume offline without any voting.

After receiving the interrupt and accessing the attention message on the storage controller, each host system may decide whether to perform the requested action of the attention message. Accordingly, a given host system may decide whether to perform the requested action of the attention message, and then provide a response. The response may indicate whether or not the host system successfully performed the requested action. As an option, the response may include a condition code that indicates if the requested action completed successfully or failed.

In one embodiment, there may be a plurality of different condition codes available to the host systems to indicate whether the requested action was successfully performed. For example, a first condition code may be utilized by a host system to indicate that the host system successfully completed the requested action. A second condition code may be utilized by a host system to indicate that the host system is not currently able to complete the requested action. Still yet, a third condition code may be utilized by a host system to indicate that the host system does not understand the requested action. A fourth condition code may be utilized by a host system to indicate that the host system has denied the request. A fifth condition code may be utilized by a host system to indicate that the host system attempted to perform the requested action, but failed. A sixth condition code may be utilized by a host system to indicate that the host system cannot complete the requested action because it is currently using the shared volume.

As an option, yet another condition code may be utilized by a storage controller to indicate that there are no other host systems that have established path groups to the shared volume (i.e., there was no host to send the request to).

In one embodiment, any response from a host system that indicates anything other than that the requested action was successfully performed (e.g., the host system does not understand the requested action, etc.) may be treated by the initiating host system as a failure to complete the requested action.

In this manner, responses may be received from the other host systems connected to the shared volume and accumulated, where each of the responses indicates whether a respective host system was able to successfully complete an action requested by the notify command sent from the initiating host system.

In one embodiment, the notify command sent from the initiating host system to the storage controller may identify a subset of the other host systems connected to the shared volume. In such an embodiment, the initiating host system may identify the subset of the other host systems by including a directive in the notify command. As an option, the directive in the notify command may specifically identify one or more other host systems, such that only the one or more other specifically identified host systems are sent the interrupt from the storage controller that notifies each receiving host system that an attention message is pending at the storage controller. As another option, the directive in the notify command may identify one or more attributes of other host systems that are to receive the interrupt from the storage controller. In this manner, the initiating host system may limit recipients of the interrupt from the storage controller without specifically knowing the identities of the intended recipients (i.e., without knowing which host systems with access to the shared volume have said attributes).

For example, the directive in the notify command may request that all host systems utilizing a feature, such as a "Remote Pair FlashCopy" feature, stop using the feature. Accordingly, the storage controller may then identify such host systems, and provide each of the host systems with an interrupt. In this way, the directive may be used to tell other host systems to temporarily stop using this feature. Some time later, another message may be issued to indicate the host systems may resume usage of the feature.

Still referring to FIG. 5, a message is received from the storage controller at operation 506. Further, the message indicates that responses have been received from the other host systems connected to the shared volume. In this manner, the initiating host system may be notified of the responses that indicate whether the other host systems connected to the shared volume were able to successfully complete the action initiated by the notify command previously sent from the initiating host system.

In one embodiment, the initiating host system may be notified of the responses using an interrupt. For example, the initiating host system may receive from the storage controller an interrupt that indicates an attention message is pending on the storage controller for the initiating host system.

At operation 508, the initiating host system reviews the responses received from the other host systems connected to the shared volume. In one embodiment, the initiating host system may review the responses received from the other host systems by accessing the attention message, on the storage controller, that includes the responses from the other host systems. Accordingly, for each of the other host systems connected to the shared volume, the attention message may include a response that indicates whether the other host system was able to successfully complete the action in the notify command.

In this manner, the initiating host may receive a response from each of the other host systems connected to a shared volume without being aware of how many other host systems are connected to the shared volume. Similarly, the initiating host may receive a response from each of the other host systems connected to the shared volume without being aware of the identities of the other host systems that are connected to the shared volume, or the operating systems or applications running on such other host systems.

In one embodiment, each response may be associated with a host system identifier to identify the host system the response originated from. Using the host system identifiers, the initiating host system may generate a communication identifying the host systems that failed to complete the action initiated by the notify command. Additionally, the communication may include the reason codes for each host system. Such a communication may be used by a user, such as an administrator, for diagnosing problems associated with specific host systems.

Based on a the responses, the initiating host then determines, at operation 510, whether the other host systems connected to the shared volume were able to successfully complete the requested action. In one embodiment, if any of the responses do not indicate successful completion of the requested action, then it may be determined that the other host systems were not able to successfully complete the requested action.

If, at operation 510, the responses do not indicate successful completion of the requested action, then performance of the transforming operation is cancelled at operation 514. In other words, if all of the other host systems connected to the shared volume are unable to complete the requested action (e.g., take the shared volume offline, quiesce the shared volume, force the shared volume offline, etc.) then the initiating volume may cancel the transforming operation.

Because the shared volume may be read and/or written by any of the host systems connected to the shared volume, an operation performed by one of the host systems may affect usage of the shared volume by the other host systems. Accordingly, when a host system performs a transforming operation that changes the contents of the shared volume, and the other host systems are unaware, the other host systems may maintain stale information regarding system attributes of the shared volume, such as a directory location on the shared volume. As a result, the other host systems may use the stale information for writing to a location on the shared volume that they believe to store a directory, but the directory has been moved due to the operation. This may result in the corruption of data sets and/or control structures stored on the shared volume.

However, if, at operation 510, the responses indicate successful completion of the requested action, then the transforming operation is performed at operation 512. In other words, if all of the other host systems connected to the shared volume are able to complete the requested action (e.g., take the shared volume offline, quiesce the shared volume, force the shared volume offline, etc.), then the initiating host system may perform the transforming operation on the shared volume.

In one embodiment, the initiating host may issue to the storage controller a reserve command for the shared volume prior to sending, at operation 504, the notify command. When the shared volume is reserved due to the reserve command, read/write access to the shared volume may be prevented during the operations of the method 500. In particular, when the shared volume is reserved due to the reserve command, read/write access attempts to the shared volume may timeout. In such an embodiment, after the completion of the operations of the method 500, the initiating host system may release the reserve. In other words, the initiating host system may release the reserve after performing the transforming operation on the shared volume, or after canceling the transforming operation.

In another embodiment, the initiating host may issue to the storage controller a fencing command to fence the shared volume prior to sending, at operation 504, the notify command. As a result of the fencing command, the shared volume may thereafter be fenced. Fencing the shared volume includes any operation that prevents any new host system from accessing the shared volume. In other words, after the shared volume is fenced, no additional host systems may vary the shared volume online. In such an embodiment, after the completion of the operations of the method 500, the initiating host system may reset the fence of the shared volume. In other words, the initiating host system may reset the fence after performing the transforming operation on the shared volume, or after canceling the transforming operation.

Accordingly, if the initiating host system issues a reserve command and a fencing command for the shared volume prior to issuing the notify command, then no new hosts may be given access to the shared volume. After completion of the method 500, releasing the reserve and resetting the fence of the shared volume may allow new hosts to connect to the shared volume and access the shared volume.

In one embodiment, the reserving and fencing of the shared volume may be mediated by the storage controller. In other words, the storage controller may receive the reserve command from the initiating host system, and in response prevent read/write access to the shared volume. Similarly, the storage controller may receive the fencing command from the initiating host system, and in response prevent new host systems from accessing the shared volume.

In some embodiments, after the initiating host system performs the transforming operation at operation 512, the initiating host system may issue another command to the storage controller. The other command may direct the storage controller to notify the other host systems to perform another action on the shared volume. For example, in one embodiment, the other command may direct the storage controller to notify the other host systems to perform a resume device action on the shared volume.

In various embodiments, after an initiating host system has instructed the other host systems to perform a resume device action, the initiating host system may proceed to independently access the shared volume as needed.

In response to the other command, the storage controller may create another pending attention message, and again broadcast an interrupt to the other host systems to notify each of the other host systems that an attention message is pending. As noted above, the other host systems may include any host system with an active path group to the shared volume. Accordingly, the storage controller may track which host systems have an active path group established to the shared volume. The attention message may inform each of the other host systems connected to the shared volume that it can resume access of the shared volume.

In one embodiment, a reply to such an attention message is not requested, and each of the other host systems may then resume access of the shared volume. In other words, each of the other host systems connected to the shared volume may resume access to the shared volume in response to accessing the attention message that allows it to resume access.

In another embodiment, the attention message may request that each of the other host systems connected to the shared volume provide a reply that indicates whether or not the host system is able to successfully resume access of the shared volume. Accordingly, each of the other host systems may reply to the attention message by indicating to the storage controller whether or not it was able to resume access of the shared volume. The storage controller may aggregate the replies of the other host systems.

Still yet, the storage controller may make pending an attention message that includes the contents of the replies of the other host systems. As an option, the initiating host system may be notified, via an interrupt, of the attention message including the contents of the replies. The initiating host system may retrieve the attention message from the storage controller to review the replies of the other host systems. Each reply may be associated with a host system identifier to identify the host system the reply originated from. As another option, the attention message may be viewed or display by a user, such as an administrator, to determine whether any errors occurred during resuming volume access.

In one embodiment, the initiating host system may identify unusual resume activity within the replies from the other host systems. For example, based on a reply from a given host system, the initiating host system may announce to a communication pool that the given host system was unable to resume activity on the shared volume. Such an announcement may be used to diagnose problematic host systems.

When a host system resumes access to a shared volume, the host system resuming access may locate a data structure on the shared volume. The data structure on the shared volume may provide a mechanism to locate data sets that reside in the shared volume. In one embodiment, the data structure may include a Volume Table Of Contents (VTOC) of the shared volume. After locating the data structure on the shared volume, the host system may refresh control blocks of the host system that are used to access the shared volume. Using the updated control blocks, components of the host system may be able to identify relocated data sets within the shared volume, and re-open, from a new location, previously opened data sets.

In this manner, prior to an initiating host system performing a transforming operation on a shared volume, the initiating host system may ensure that other host systems are not actively using the shared volume by polling, via a storage controller, the other host systems. Each of the other host systems connected to the shared volume may be asked to cast a vote as to whether the initiating host system may perform the transforming operation on the shared volume. After all host systems have responded, the storage controller summarizes the result and presents the result to the initiating host system. Further, after completing the transforming operation on the shared volume, the initiating host system can notify the other host systems, via the storage controller, that the transforming operation has completed and the other host systems may resume access of the shared volume.

Accordingly, in a shared-resource environment, data loss may be prevented by preventing transforming operations, such as re-imaging operations, on a shared volume without permissive votes from host systems that are using the shared volume. Further, a host system that intends to perform the transforming operation may initiate the voting by sending a command to a storage controller managing the shared volume, where the storage controller then in turns asks if the host systems connected to the shared volume can support the initiating host system's transforming operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:

making a determination, by a computer, to perform a transforming operation on a shared volume;

sending, by the computer, a notify command to a storage controller of the shared volume, the notify command including an action to be taken by other hosts connected to the shared volume;

receiving, by the computer, a message from the storage controller indicating that responses have been received from the other host systems connected to the shared volume;

determining, by the computer, whether to perform the transforming operation based on the responses; and performing, by the computer, the transforming operation on the shared volume in response to the responses from the other host systems indicating that the other host systems successfully performed the action specified in the notify command.

2. The method of claim 1, wherein the notify command is sent to the storage controller in response to the determination to perform the transforming operation on the shared volume.

3. The method of claim 2, wherein the notify command requests that each of the other host systems vote as to whether the shared volume can go offline.

4. The method of claim 2, wherein the notify command requests that each of the other host systems quiesce the shared volume.

5. The method of claim 1, comprising canceling, by the computer, the transforming operation on the shared volume in response to the responses from the other host systems not indicating that the other host systems successfully performed the action specified in the notify command.

6. The method of claim 1, comprising sending, by the computer, a reserve command for reserving the shared volume prior to sending the notify command.

7. The method of claim 6, comprising releasing, by the computer, the reserve on the shared volume after performing the transforming operation.

8. The method of claim 1, comprising sending, by the computer, a fencing command for fencing the shared volume prior to sending the notify command.

9. The method of claim 8, comprising resetting, by the computer, the fence on the shared volume after performing the transforming operation.

10. The method of claim 1, wherein the notify command includes an instruction for causing the storage controller to perform an action selected from the group consisting of: reserving the shared volume and fencing a shared volume, in response to receiving the notify command.

11. The method of claim 1, comprising sending, by the computer, a second command to the storage controller, the second command directing the storage controller to notify the other host systems to perform another action on the shared volume.

12. A computer program product for volume transformation in a shared-resource environment, the computer program product comprising a computer readable storage medium having program instructions embodied therewith, wherein the computer readable storage medium is not a transitory signal per se, the program instructions executable by a computer to cause the computer to perform a method comprising:

making a determination, by the computer, to perform a transforming operation on a shared volume;

sending, by the computer, a notify command to a storage controller of the shared volume in response to the determination to perform the transforming operation on the shared volume, the notify command including an action to be taken by other hosts connected to the shared volume;

receiving, by the computer, a message from the storage controller indicating that responses have been received from the other host systems connected to the shared volume;

determining, by the computer, whether to perform the transforming operation based on the responses; and performing, by the computer, the transforming operation on the shared volume in response to the responses from the other host systems indicating that the other host systems successfully performed the action specified in the notify command.

13. The computer program product of claim 12, wherein the notify command requests that each of the other host systems vote as to whether the shared volume can go offline.

14. The computer program product of claim 12, wherein the notify command requests that each of the other host systems quiesce the shared volume.

15. The computer program product of claim 12, comprising program instructions for canceling, by the computer, the transforming operation on the shared volume in response to the responses from the other host systems not indicating that the other host systems successfully performed the action specified in the notify command.

16. The computer program product of claim 12, comprising program instructions for sending, by the computer, a reserve command for reserving the shared volume prior to sending the notify command; and releasing, by the computer, the reserve on the shared volume after performing the transforming operation.

17. The computer program product of claim 12, comprising program instructions for sending, by the computer, a fencing command for fencing the shared volume prior to sending the notify command; and resetting, by the computer, the fence on the shared volume after performing the transforming operation.

18. The computer program product of claim 12, wherein the notify command includes an instruction for causing the storage controller to perform an action selected from the group consisting of: reserving the shared volume and fencing a shared volume, in response to receiving the notify command.

19. The computer program product of claim 12, comprising program instructions for sending, by the computer, a second command to the storage controller, the second command directing the storage controller to notify the other host systems to perform another action on the shared volume.

20. A system, comprising:

a processor and logic integrated with and/or executable by the processor, the logic being configured to cause the processor to:

make a determination to perform a transforming operation on a shared volume;

send a notify command to a storage controller of the shared volume in response to the determination to perform the transforming operation on the shared volume, the notify command including an action to be taken by other hosts connected to the shared volume;

receive a message from the storage controller indicating that responses have been received from the other host systems connected to the shared volume;

determine whether to perform the transforming operation based on the responses; and perform the transforming operation on the shared volume in response to the responses from the other host systems indicating that the other host systems successfully performed the action specified in the notify command.

* * * * *